(12) United States Patent
Ge et al.

(10) Patent No.: US 12,451,836 B2
(45) Date of Patent: Oct. 21, 2025

(54) FIXING CLAMP AND TURN-OFF DEVICE

(71) Applicant: ZHEJIANG TWINSEL ELECTRONIC TECHNOLOGY CO., LTD., Ningbo (CN)

(72) Inventors: Chunlai Ge, Ningbo (CN); Xueren Zeng, Ningbo (CN); Qian Xu, Ningbo (CN); Ziqian Wang, Ningbo (CN); Liangchang Miao, Ningbo (CN)

(73) Assignee: ZHEJIANG TWINSEL ELECTRONIC TECHNOLOGY CO., LTD., Ningbo (CN)

( * ) Notice: Subject to any disclaimer, the term of this patent is extended or adjusted under 35 U.S.C. 154(b) by 1 day.

(21) Appl. No.: 18/593,222

(22) Filed: Mar. 1, 2024

(65) Prior Publication Data

US 2024/0413788 A1 Dec. 12, 2024

(30) Foreign Application Priority Data

Jun. 8, 2023 (CN) .......................... 202321452228.5

(51) Int. Cl.
*H02S 40/00* (2014.01)
*F16M 13/02* (2006.01)
*H02S 30/00* (2014.01)

(52) U.S. Cl.
CPC ............. *H02S 40/00* (2013.01); *F16M 13/02* (2013.01); *H02S 30/00* (2013.01)

(58) Field of Classification Search
CPC ......... F16M 13/02; H02S 40/00; H02S 30/00; F16L 3/00; F16L 3/006; F16L 3/02; F16L 3/08; F16L 3/12; F16L 3/123
See application file for complete search history.

(56) References Cited

U.S. PATENT DOCUMENTS

| | | | | |
|---|---|---|---|---|
| 3,363,865 A * | 1/1968 | Metsker | ................ | F16L 3/1025 24/271 |
| 3,730,466 A * | 5/1973 | Swanquist | ............. | H02G 3/125 220/3.9 |
| 3,780,209 A * | 12/1973 | Schuplin | ................ | H02G 3/125 24/336 |
| 4,466,589 A * | 8/1984 | Leonardo | .................. | F16L 3/00 248/74.1 |
| 5,533,696 A * | 7/1996 | Laughlin | .................. | F16L 3/12 248/74.1 |

(Continued)

*Primary Examiner* — Monica E Millner
(74) *Attorney, Agent, or Firm* — Tyler Sisk; Casimir Jones SC

(57) ABSTRACT

Provided are fixing clamp and turn-off device. The fixing clamp includes clamp body and an elastic plate, wherein the clamp body includes first section, second section, and third section, the first section and the third section are separately connected to two ends of the second section, and the first section and the third section both are located at the same side of the second section; the elastic plate includes connecting end and an open end, the connecting end is connected to the first section, and gap is provided between the open end and the third section, so that the elastic plate is in cantilevered structure relative to the first section; and an accommodation space is formed between the clamp body and the elastic plate, and at least one of the first section, the second section, and the third section is provided with protrusion part.

9 Claims, 3 Drawing Sheets

(56) References Cited

U.S. PATENT DOCUMENTS

| | | | | |
|---|---|---|---|---|
| 8,382,513 | B2* | 2/2013 | Kobayashi | F24S 25/61 |
| | | | | 439/507 |
| 9,249,925 | B2* | 2/2016 | Roensch | F24S 25/16 |
| 9,777,948 | B2* | 10/2017 | Braunstein | F16B 5/0685 |
| 10,187,004 | B2* | 1/2019 | Rothschild | F24S 25/613 |
| 11,378,111 | B2* | 7/2022 | Kuhl | F16B 7/22 |
| 2003/0213876 | A1* | 11/2003 | Takeuchi | H05K 7/12 |
| | | | | 248/74.1 |
| 2014/0263871 | A1* | 9/2014 | Rouleau | F16L 3/24 |
| | | | | 248/65 |
| 2014/0360737 | A1* | 12/2014 | Kim | F16L 3/00 |
| | | | | 169/51 |
| 2024/0039257 | A1* | 2/2024 | Martin | H02G 3/0456 |
| 2024/0305077 | A1* | 9/2024 | Peck | H02G 3/263 |
| 2024/0309936 | A1* | 9/2024 | Schimpf | H02S 30/10 |

* cited by examiner

FIXING CLAMP AND TURN-OFF DEVICE

CROSS-REFERENCE TO RELATED APPLICATION

The present disclosure claims the priority to the Chinese patent application with the filing No. 2023214522285 filed with the Chinese Patent Office on Jun. 8, 2023, and entitled "Fixing Clamp and Turn-off Device", the contents of which are incorporated herein by reference in entirety.

TECHNICAL FIELD

The present disclosure relates to the field of turn-off devices, and specifically relates to a fixing clamp and turn-off device (shut-off device).

BACKGROUND ART

A turn-off device is configured to turn off (shut off) a photovoltaic module rapidly, and the turn-off device includes a housing, electronic components provided in the housing, and connecting wires leading from the housing.

In a practical working process, the housing of the turn-off device is not easy to locate due to its specific shape and structure, which in turn affects the use effect. The housing of the turn-off device is also not easy to disassemble and assemble after located, which results in a problem of low efficiency of disassembly and assembly.

SUMMARY

The present disclosure provides a fixing clamp and a turn-off device, which can accurately locate the housing of the turn-off device so that the housing of the turn-off device is easy to disassemble and assemble, thereby improving the efficiency of disassembly and assembly.

Embodiments of the present disclosure can be realized in the following way.

The embodiments of the present disclosure provide a fixing clamp, including:

a clamp body and an elastic plate, wherein the clamp body includes a first section, a second section, and a third section, wherein the first section and the third section are separately connected to two ends of the second section, and the first section and the third section both are located at the same side of the second section; the elastic plate includes a connecting end and an open end, wherein the connecting end is connected to the first section, and a gap is provided between the open end and the third section, so that the elastic plate is in a cantilevered structure relative to the first section; and an accommodation space is provided between the clamp body and the elastic plate, and at least one of the first section, the second section, and the third section is provided with a protrusion part.

Optionally, the first section, the second section, and the third section are all provided with the protrusion part.

Optionally, the protrusion part on the first section is configured to be flush to the protrusion part on the third section.

Optionally, a first wall surface and a second wall surface are provided oppositely on the clamp body, wherein a direction from the first wall surface to the second wall surface is consistent with a direction of the housing of the turn-off device extending into the accommodation space; and the fixing clamp further includes a blocking part, wherein the blocking part is connected to the first section, the second section, and the third section at the same time, and the blocking part is closer to the second wall surface relative to the first wall surface.

Optionally, the protrusion part is closer to the first wall surface relative to the second wall surface.

Optionally, a first curved surface is formed on one side of the protrusion part near the first wall surface.

Optionally, the elastic plate is in a curved structure.

Optionally, a raised curved surface and a concave curved surface are provided on one side of the elastic plate near the second section.

Optionally, the first section and third section are configured in parallel, thus allowing the clamp body to be in a U-shaped structure.

The embodiments of the present disclosure further provide a turn-off device, which includes the fixing clamp.

The beneficial effects of the fixing clamp and turn-off device provided by the embodiments of the present disclosure, for example, include the following.

The fixing clamp includes the clamp body and the elastic plate, wherein the clamp body includes the first section, the second section, and the third section; the first section and the third section are separately connected to two ends of the second section, and the first section and the third section both are located at the same side of the second section; the elastic plate includes the connecting end and the open end, wherein the connecting end is connected to the first section, and the gap is provided between the open end and the third section so that the elastic plate is in the cantilevered structure relative to the first section; and the accommodation space is provided between the clamp body and the elastic plate, and at least one of the first section, the second section, and the third section is provided with the protrusion part. When locating and installing the housing of the turn-off device, the end portion of the housing of the turn-off device can be extended into the accommodation space, so that the protrusion part is in contact with the housing of the turn-off device to play a role of position limitation. Therefore, the accurate locating for the housing of the turn-off device is realized. Furthermore, the elasticity of the elastic plate can drive the open end to move, so that the housing of the turn-off device is easy to put in and take out, thereby improving the efficiency of disassembly and assembly.

The turn-off device includes the fixing clamp, which has all functions of the fixing clamp.

BRIEF DESCRIPTION OF DRAWINGS

In order to more clearly illustrate the technical solutions of the embodiments of the present disclosure, the drawings to be used in the embodiments will be briefly introduced as follows. It should be understood that the following drawings only show certain embodiments of the present disclosure, and therefore should not be regarded as a limitation of the scope. For the person of ordinary skill in the art, other relevant drawings can be obtained according to these drawings without inventive efforts.

Figure 1:
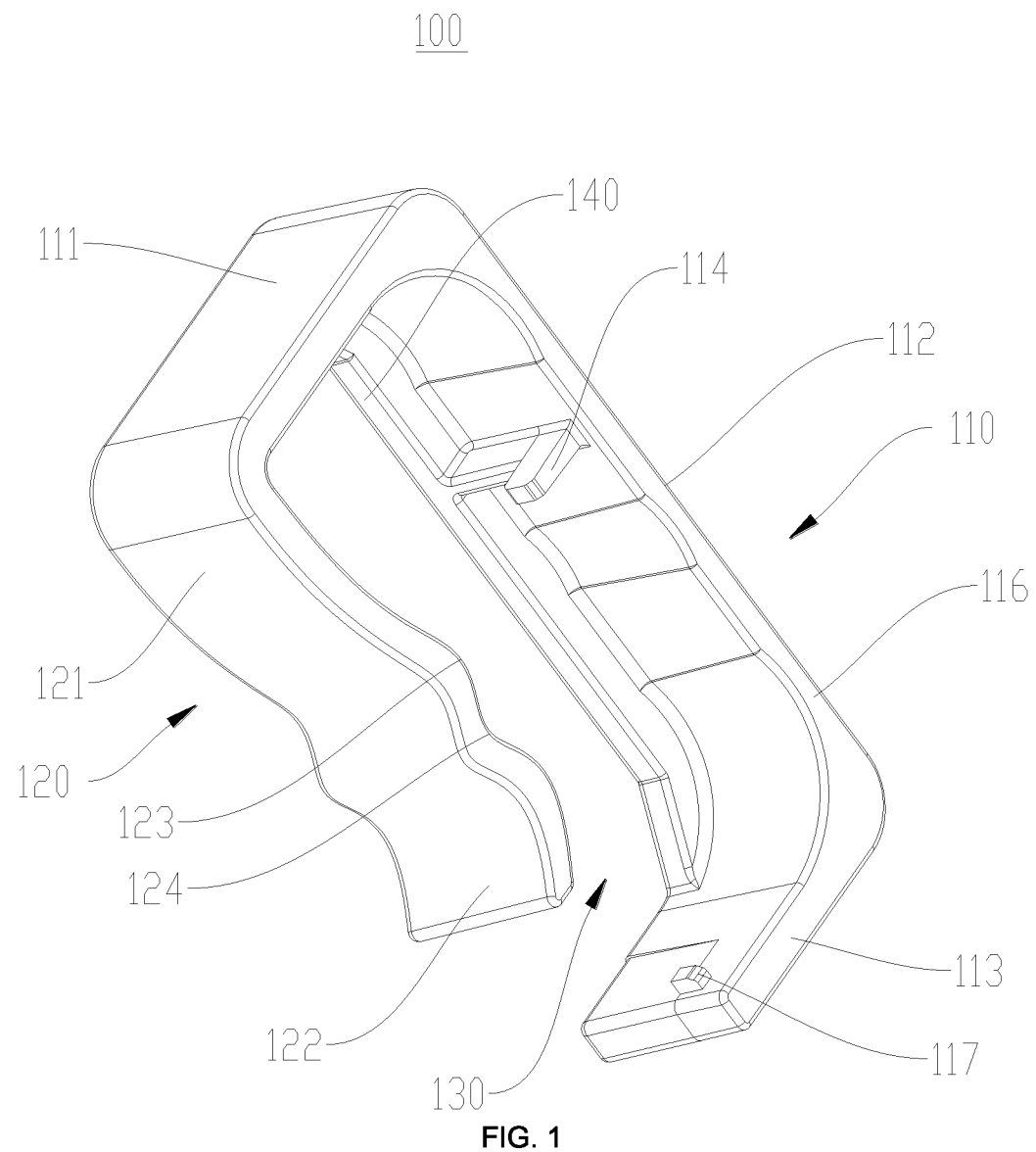
FIG. 1 shows a structure schematic diagram of a first view of a fixing clamp provided by the embodiments of the present disclosure.

Reference numbers: 100—fixing clamp; 110—clamp body; 111—first section; 112—second section; 113—third section; 114—protrusion part; 115—first wall surface; 116—second wall surface; 117—first curved surface; 120—elastic plate; 121—connecting end; 122—open end; 123—raised curved surface; 124—concave curved surface; 130—accommodation space; 140—blocking part.

DETAILED DESCRIPTION OF EMBODIMENTS

In order to make the objective, technical solutions, and advantages of the embodiments in the present disclosure clearer, the technical solutions of the embodiments in the present disclosure will be clearly and completely described below in conjunction with the drawings of embodiments in the present disclosure. It is clear that the described embodiments are partial embodiments of the present disclosure embodiments and not all of the embodiments. The components of the embodiments in the present disclosure generally described and shown in the drawings herein can be configured and designed in a variety of different configurations.

Therefore, the following detailed description of embodiments in the present disclosure provided by the drawings is not intended to limit the scope of the present disclosure claimed but only represents the selected embodiments of the present disclosure. Based on the embodiments in the present disclosure, all the other embodiments acquired by the person ordinarily skilled in the art without inventive efforts shall fall within the scope of protection of the present disclosure.

It should be noted that similar symbols and letters represent similar items in the following drawings, so that once an item is defined in one drawing, no further definition or explanation is required in the subsequent drawings.

It should be noted that the orientation or positional relationship indicated by the terms "up", "down", "inside", "outside", etc. is based on the orientation or positional relationship shown in the drawings or the orientation or positional relationship in which the product of the present disclosure is customarily placed when used. They are used only for the purpose of facilitating the description of the present disclosure and simplifying the description and are not to indicate or imply that the device or element referred to must have a particular orientation, or be constructed and operated in the particular orientation, and therefore cannot be understood as a limitation of the present disclosure.

Additionally, the terms "first", "second", etc. are only used to distinguish the descriptions and are not to be understood as indicating or implying relative importance.

The terms "include", "comprise" or any other variant thereof are intended to cover non-exclusive inclusion so that the progress, method, object, or equipment including a set of elements include not only those elements, but also include other elements not explicitly listed, or further include the elements inherent to the process, method, object, or equipment. Without more limitation, the elements defined by the phrase "including a . . . " do not exclude that the other same element further exists in the process, method, object, or equipment including the elements.

Unless otherwise expressly stipulated and limited, the terms "configure", "connect" and the like are to be understood in a broad sense, e.g. "connect" can be a fixed connection, a detachable connection, or an integral connection; a mechanical connection or an electrical connection; a direct connection, an indirect connection through an intermediate medium, or a communication inside the two elements. For the person of ordinary skill in the art, the specific meanings of the above terms in the present disclosure can be understood according to specific situations.

It is noted that the features in the embodiments of the present disclosure can be combined with each other without conflict.

A turn-off device is configured to turn off a photovoltaic module rapidly, and the turn-off device includes a housing, electronic components provided in the housing, and connecting wires leading from the housing. After researching, the inventor found that in a practical working process, the housing of the turn-off device is not easy to locate due to its specific shape and structure, which in turn affects the use effect. The housing of the turn-off device is also not easy to disassemble and assemble after located, which results in a problem of low efficiency of disassembly and assembly.

Figure 2:
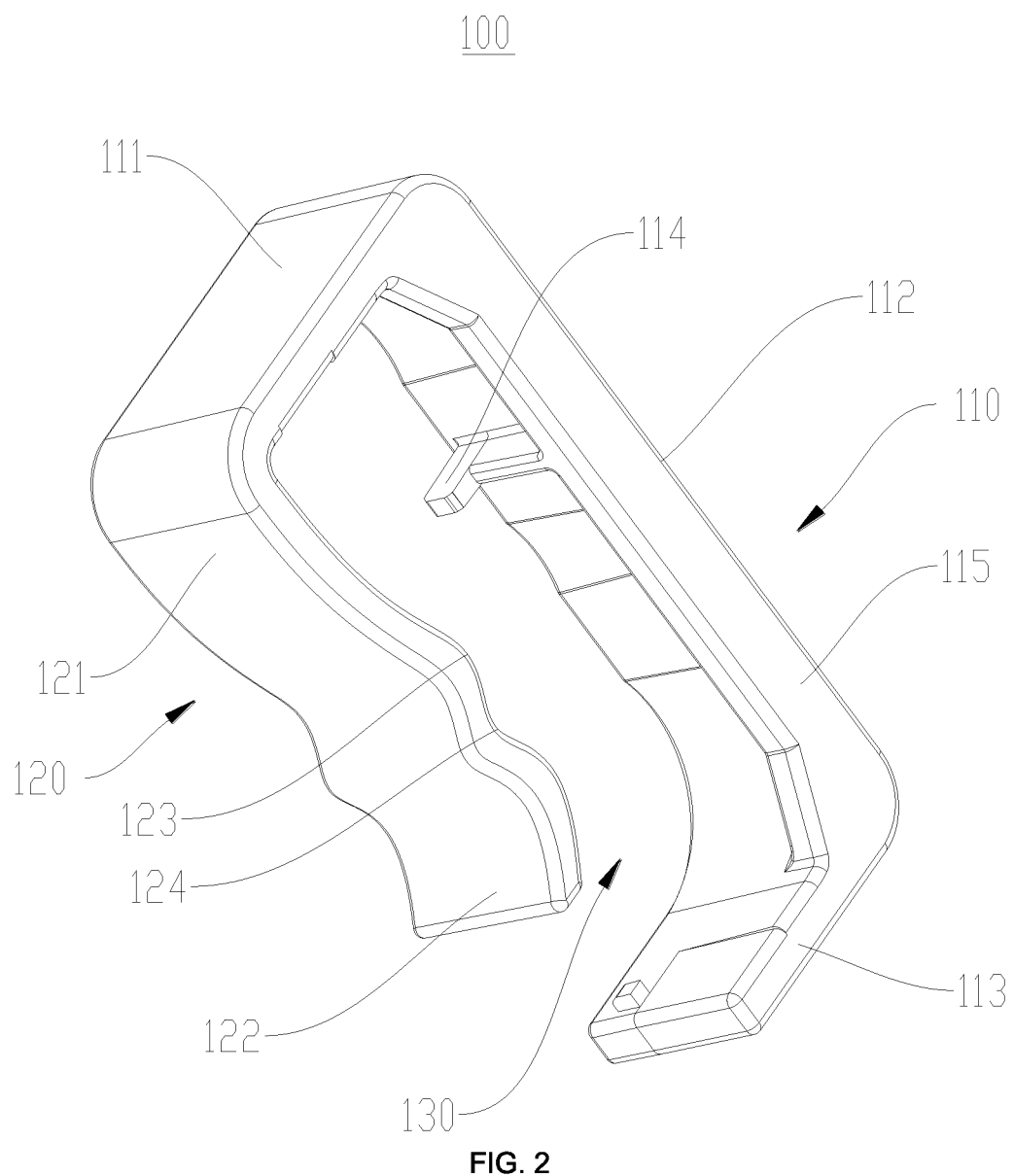
FIG. 2 shows a structure schematic diagram of a second view of a fixing clamp provided by the embodiments of the present disclosure.
Figure 3:
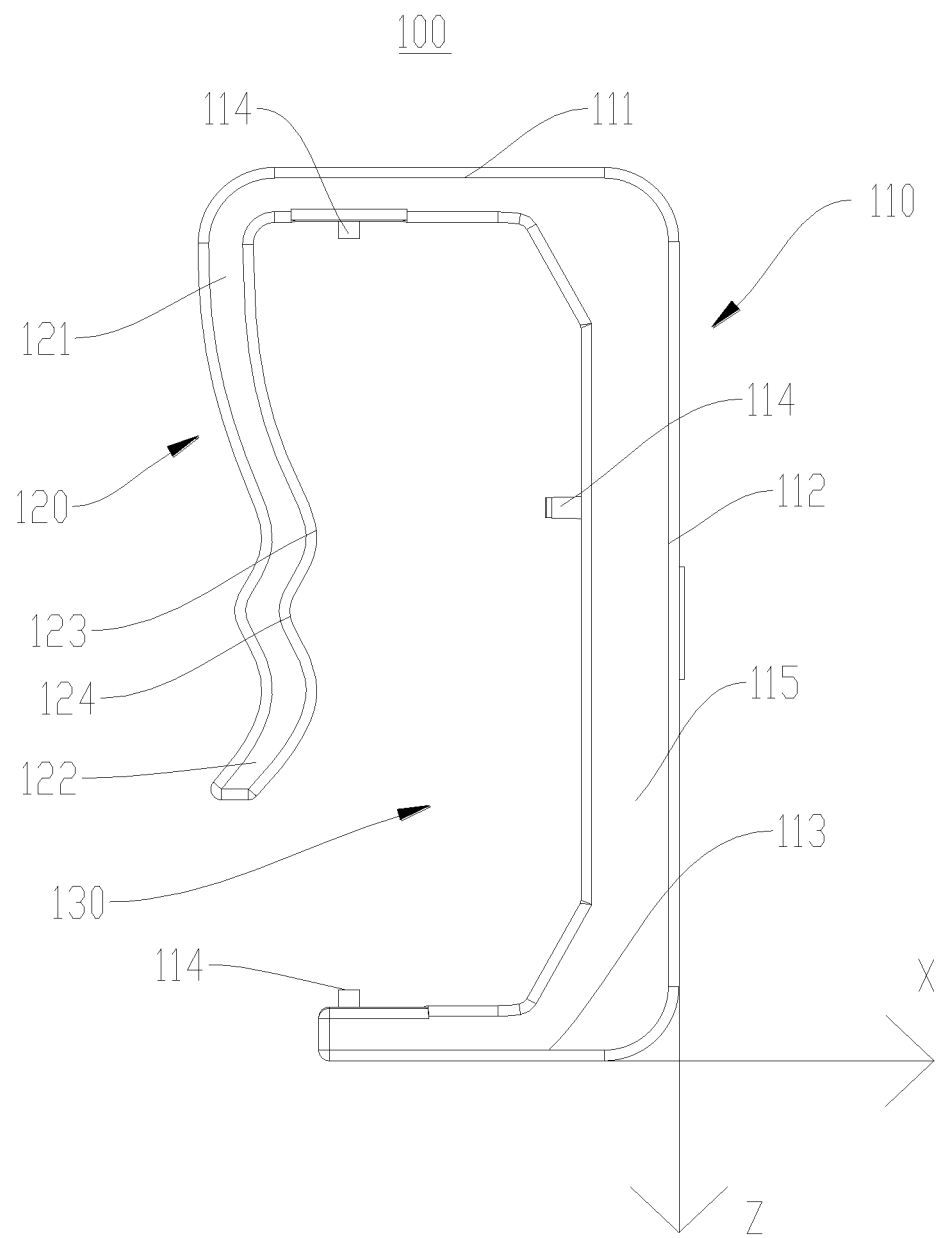
FIG. 3 shows a structure schematic diagram of a third view of a fixing clamp provided by the embodiments of the present disclosure.

Referring to FIG. 1-FIG. 3, a fixing clamp 100 and turn-off device provided by the embodiments of the present disclosure can solve the above problems, which will be described next in detail.

Referring to FIG. 1 and FIG. 2, the fixing clamp 100 includes a clamp body 110 and an elastic plate 120, wherein the clamp body 110 includes a first section 111, a second section 112, and a third section 113; the first section 111 and the third section 113 are separately connected to two ends of the second section 112, and the first section 111 and the third section 113 both are located at the same side of the second section 112; the elastic plate 120 includes a connecting end 121 and an open end 122, the connecting end 121 is connected to the first section 111, and a gap is provided between the open end 122 and the third section 113, so that the elastic plate 120 is in a cantilevered structure relative to the first section 111; and an accommodation space 130 is formed between the clamp body 110 and the elastic plate 120, and at least one of the first section 111, the second section 112, and the third section 113 is provided with a protrusion part 114.

When locating and installing the housing of the turn-off device by the fixing clamp 100, the end portion of the housing of the turn-off device can be extended into the accommodation space 130, so that the protrusion part 114 is in contact with the housing of the turn-off device to play a role of position limitation, so as to realize the accurate locating for the housing of the turn-off device. Furthermore, the elasticity of the elastic plate 120 can drive the open end 122 to move, so that the housing of the turn-off device is easy to put in and take out, thereby improving the efficiency of disassembly and assembly for the housing of the turn-off device. During the manufacturing process, the clamp body 110 and the elastic plate 120 are preferentially selected to be integrally molded through injection molding.

The first section 111 and third section 113 are configured in parallel, thus allowing the clamp body 110 to be in a U-shaped structure. Rounding can be performed at the connection positions between the first section 111, the second section 112, and the third section 113 so that sharp edges will not be formed at either the inside corner locations or the outside corner locations, thereby preventing staff or other elements from being injured or damaged during the process of using or installing.

Referring to FIG. 3, in the embodiment, the first section 111, the second section 112, and the third section 113 are all provided with the protrusion parts 114, i.e., at least three protrusion parts 114 are provided. Three sections of the clamp body 110 are all provided with the protrusion parts 114, which increases the fitting positions for the housing of the turn-off device, so that the locating for the housing of the turn-off device is more accurate, thereby avoiding the risk of locating error of the housing of the turn-off device due to slight tilting during the locating process.

Of course, in other embodiments of the present disclosure, the number of the protrusion parts 114 can be one, wherein one protrusion part 114 can be provided on the first section 111, the second section 112, or the third section 113. The number of the protrusion parts 114 can further be two, wherein the two protrusion parts 114 can be provided both on the first section 111, the second section 112, or the third section 113. They can also be separately provided at the first section 111 and the second section 112; or the first section 111 and the third section 113; or the second section 112 and the third section 113. It is noted that the specific number and location of the protrusion part 114 provided are not limited.

In the embodiment, the protrusion part 114 on the first section 111 is configured to be flush to the protrusion part 114 on the third section 113, so that the forces on the corresponding different side surfaces of the housing of the turn-off device are more balanced when cooperatively located with the protrusion part 114.

Specifically, when the overall fixing clamp 100 is in a vertical state (the vertical state can be understood as a state when the second section 112 is vertically placed along an extension direction thereof), the extension direction of the third section 113 can be X direction and the extension direction of the second section 112 can be Z direction; and the flush arrangement of the protrusion part 114 on the first section 111 with the protrusion part 114 on the third section 113 can be understood as that coordinate values of both of the foregoing protrusion parts 114 are the same in X direction, or both of the foregoing protrusion parts 114 can be on the same extending line parallel to the Z direction.

Additionally, the first section 111 and third section 113 can be configured in parallel, the clamp body 110 can be in the U-shaped structure, and the accommodation space 130 is formed inside of the U-shape structure. The elastic plate 120 is configured to be able to close the opened part on the top side of the U-shaped clamp body 110 so that the housing of the turn-off device is fixed in the accommodation space 130.

Referring to FIG. 1 and FIG. 2, the first wall surface 115 and the second wall surface 116 are provided oppositely on the clamp body 110, wherein the direction from the first wall surface 115 to the second wall surface 116 is consistent with the direction of the housing of the turn-off device extending into the accommodation space 130; and the fixing clamp 100 further includes the blocking part 140, wherein the blocking part 140 is connected to the first section 111, the second section 112, and the third section 113 at the same time, and the blocking part 140 is closer to the second wall surface 116 relative to the first wall surface 115.

In the above technical solutions, the blocking part 140 is configured to play a role of position limitation for the axial direction when the housing of the turn-off device is put into the accommodation space 130, which prevents two ends of the housing of the turn-off device from extending out of the accommodation space 130.

Specifically, the blocking part 140 is in the form of a sheet, and one plane of the blocking part 140 is kept to be flush to the second wall surface 116, so as to avoid the accumulation of impurities or dust due to the step. Furthermore, side edges of the part of the blocking part 140 corresponding to the second section 112 are straight edges. The side edge of the part of the blocking part 140 corresponding to the first section 111 and the third section 113 is a bevel, and obtuse angles are formed between the bevel and the straight edges. The range of the obtuse angles can be 110°~160°, and specifically can be 110°, 120°, 130°, 140°, 150°, 160°, etc.

In the embodiment, the protrusion part 114 is closer to the first wall surface 115 relative to the second wall surface 116. Specifically, a spacing exists between the side of the protrusion part 114 away from the second wall surface 116 and the first wall surface 115. Furthermore, a first curved surface 117 is formed on one side of the protrusion part 114 near the first wall surface 115, so that the first curved surface 117 can play a role of cushioning and guiding when matched with the housing of the turn-off device.

Referring to FIG. 1-FIG. 3, the elastic plate 120 is in a curved structure, which helps to flick the elastic plate 120 so that the elastic plate 120 has a greater elasticity.

Specifically, a raised curved surface 123 and a concave curved surface 124 are formed at one side of the elastic plate 120 near the second section 112, so as to increase the clamping force of the elastic plate 120 for the housing of the turn-off device by providing the concave curved surface 124 and the raised curved surface 123.

In the embodiment, the raised curved surface 123 and the concave curved surface 124 are provided between the connecting end 121 and the open end 122, wherein the number of raised curved surface 123 is one and the number of concave curved surfaces 124 is two, and the one raised curved surface 123 is provided between the two concave curved surfaces 124.

It is noted that a raised curved surface 123 and a concave curved surface 124 are also formed at one side of the elastic plate 120 away from the second section 112, wherein the position of the raised curved surface 123 on this side is provided oppositely to the position of the concave curved surface 124 on the first side near the second section 112, and the number thereof is provided equally. Similarly, the position of the concave curved surface 124 on this side is provided oppositely to the position of the raised curved surface 123 on the first side near the second section 112, and the number thereof is provided equally.

The embodiment of the present disclosure further provides a turn-off device, which includes the foregoing fixing clamp 100, and further includes a housing, built-in elements, and connecting wires. The built-in elements are provided in an inner chamber of the housing so that the housing can play a certain role of shielding and protection for the built-in elements. One end of the connecting wires is connected with the built-in elements, and the other end passes through the housing to connect to an external element, so as to realize a communication function for the turn-off device.

It is noted that two fixing clamps 100 are provided in the turn-off device, and the two fixing clamps 100 are symmetrically provided to fix two ends of the housing of the turn-off device.

The turn-off device includes the foregoing fixing clamp 100, which has at least the following advantages. (1) It is convenient to fix the housing of the turn-off device, easy to use, and highly practical. (2) The fixing clamp 100 is convenient to disassemble and replace, which can improve the convenience of use. (3) The fixing clamp 100 is made of a material of good flame retardancy, which is high temperature resistant and has great UV resistance, and has a long service life. (4) The elastic plate 120 is designed with double curved surfaces to increase frictional force and clamping force, which is convenient to snap and fix, and is not easy to slip.

The above-mentioned are only the specific implementations of the present disclosure, but the scope of protection of the present disclosure is not limited thereto. Any changes or substitutions that can be easily thought of by any skilled person familiar with the technical field in the technical scope disclosed by the present disclosure shall be covered within the scope of protection of the present disclosure. Therefore, the scope of protection of the present disclosure shall be subject to the scope of protection of claims.

What is claimed is:

1. A fixing clamp, comprising
a clamp body and an elastic plate,
wherein the clamp body comprises a first section, a second section, and a third section; the first section and the third section are separately connected to two ends of the second section, and the first section and the third section both are located at a same side of the second section; the elastic plate comprises a connecting end and an open end, the connecting end is connected to the first section, and a gap is provided between the open end and the third section, so that the elastic plate is in a cantilevered structure relative to the first section; and an accommodation space is formed between the clamp body and the elastic plate, and at least one of the first section, the second section, and the third section is provided with a protrusion part, wherein a first wall surface and a second wall surface are provided oppositely on the clamp body, and a direction from the first wall surface to the second wall surface is consistent with a direction of a housing of a turn-off device extending into the accommodation space; and the fixing clamp further comprises a blocking part, wherein the blocking part is connected to the first section, the second section, and the third section at the same time; and the blocking part is closer to the second wall surface relative to the first wall surface.

2. The fixing clamp according to claim 1, wherein the first section, the second section, and the third section are all provided with the protrusion part.

3. The fixing clamp according to claim 1, wherein the protrusion part is closer to the first wall surface relative to the second wall surface.

4. The fixing clamp according to claim 3, wherein a first curved surface is formed on one side of the protrusion part near the first wall surface.

5. The fixing clamp according to claim 1, wherein the elastic plate is in a curved structure.

6. The fixing clamp according to claim 1, wherein a raised curved surface and a concave curved surface are provided on one side of the elastic plate near the second section.

7. The fixing clamp according to claim 1, wherein the first section and third section are configured in parallel and the clamp body is of a U-shaped structure.

8. The fixing clamp according to claim 2, wherein the elastic plate is in a curved structure.

9. The fixing clamp according to claim 2, wherein a raised curved surface and a concave curved surface are provided on one side of the elastic plate near the second section.

* * * * *